United States Patent [19]
Ono et al.

[11] 3,712,192
[45] Jan. 23, 1973

[54] DEVICE FOR CONTROLLING EXPOSURE TIME IN A CAMERA

[75] Inventors: Shigeo Ono, Yokohama; Ichiro Hamaguchi, Tokyo, both of Japan

[73] Assignee: Nippon Kogaku K. K., Tokyo, Japan

[22] Filed: Feb. 24, 1972

[21] Appl. No.: 228,869

[30] Foreign Application Priority Data

March 3, 1971 Japan ................. 46/11118

[52] U.S. Cl. ........................................... 95/10 CT
[51] Int. Cl. .............................................. G03b 7/08
[58] Field of Search .................... 95/10 CT; 323/79

[56] References Cited

UNITED STATES PATENTS

| | | | |
|---|---|---|---|
| 3,470,798 | 10/1969 | Miyakawa | 95/10 |
| 3,641,890 | 2/1972 | Ono | 95/10 |
| 3,651,744 | 3/1972 | Okada | 95/10 |
| 3,535,530 | 10/1970 | Cooper et al. | 95/10 |

Primary Examiner—Samuel S. Matthews
Assistant Examiner—Michael L. Gellner
Attorney—Joseph M. Fitzpatrick et al.

[57] ABSTRACT

A device for controlling exposure time in a camera includes a photoelectric converter circuit for converting the intensity of light passed through the camera's photo-taking lens into a voltage, a storage capacitor for storing the voltage, a magnet driving circuit for driving a magnet which controls the exposure time of the camera's shutter in accordance with the voltage stored in the capacitor, a power source, and two switches for discretely making and breaking a connection between the photoelectric converter circuit and the magnet driving circuit so that a current is supplied from the power source to the magnet driving circuit only during the shutter operation. A compensation circuit including a resistor is connected with the power source in parallel relationship with the photoelectric converter circuit and the magnet driving circuit. At least one end of the capacitor is connected with the compensation circuit so that the capacitor may be supplied with part of the terminal voltage of the resistor caused by a voltage drop occurring in the power source as it supplies a current to the magnet driving circuit.

6 Claims, 4 Drawing Figures

DEVICE FOR CONTROLLING EXPOSURE TIME IN A CAMERA

BACKGROUND OF THE INVENTION

1. Field of the Invention

This invention relates to cameras capable of automatic exposure, and more particularly to a device for controlling exposure time in such cameras.

2. Description of the Prior Art

There is known a type of camera in which the intensity of light passed through its photo-taking lens is converted into an electrical quantity and stored for the purpose of automatically controlling the exposure time of the camera's shutter. It is usual to employ in such a camera, a magnet driving circuit including a magnet for controlling the shutter's exposure time, but such an arrangement consumes a relatively great deal of power from a source such as a battery. In order to reduce such power consumption, it is also known to supply a current to the magnet driving circuit only when the shutter is actually in operation and to supply a current to a photoelectric converter circuit and a storage circuit (which may sometimes include an indicator circuit for pre-indicating the exposure time to be automatically controlled) when exposure time is measured.

Such a camera has encountered the problems as will be described hereunder. Since the battery contained in the camera is of a small capacity because of the camera's spatial limitations, it can maintain its rated voltage when a small current supply therefrom is required for a measurement to be effected, but it would suffer from a voltage drop during the shutter operation which requires a relatively great deal of power supply. This voltage drop becomes greater as the power consumption of the battery increases, thus causing the magnet driving circuit to be operated only at a low voltage corresponding to the rated battery voltage minus the voltage drop, although a quantity of electricity corresponding to a higher voltage may be stored in the storage circuit on which exposure time depends. Moreover, the exposure time varies as the battery is consumed because the voltage drop varies with the degree of the battery consumption as noted above.

SUMMARY OF THE INVENTION

We have conceived apparatus of the class described by which we are able to eliminate the above-described disadvantages existing in the prior art. Thus, our invention resides in the utilization of apparatus for controlling exposure time in a camera capable of automatic exposure comprising a power source; a photoelectric converter circuit including a photoconductive element having a resistance value determined by the intensity of light from an object, and impedance means directly connected with the photoconductive element, the photoelectric converter circuit being connected with the power source; a first switch connected in series with and between the photoelectric converter circuit and the power source to make and break the connection therebetween; a storage capacitor for storing a voltage divided by the photoconductive element and impedance means when the first switch is closed; a second switch connected between the point of connection between the photoconductive element and the impedance means and one end of the capacitor, the second switch being adapted to open after the first switch is closed, the voltage stored in the storage capacitor becoming independent of any variation in the resistance value of the photoconductive element after the second switch is opened, a magnet driving circuit including a magnet for controlling the exposure time of the camera's shutter in accordance with the voltage stored in the storage capacitor, the magnet driving circuit being connected with the power source in parallel relationship with the photoelectric converter circuit; and a third switch connected between the magnet driving circuit and the power source to make and break the connection therebetween, the third switch being adapted to close after the second switch is opened.

According to a feature of the present invention, the device described above further comprises a compensation circuit connected with the power source in parallel relationship with the photoelectric converter circuit and the magnet driving circuit. The compensation circuit includes a resistor. The end of the storage capacitor, other than the end mentioned above, is connected with the compensation circuit so as to apply to the storage capacitor part of a voltage drop caused across the resistor by a voltage drop occurring in the power source when the third switch is closed.

According to a further feature of the present invention, the compensation circuit further includes a capacitor connected in series with the resistor and is connected with the power source at all times.

Another feature of the present invention resides in providing the compensation circuit with a fourth switch parallel-connected with the resistor. The fourth switch is open at least when the magnet driving circuit is in operation.

According to a further feature of the present invention, the compensation circuit is connected with the power source through the first switch.

According to yet a further feature of the present invention, the compensation circuit includes a fifth switch serially connected therein so that the storage capacitor is effectively connected with the power source through the second switch even when the compensation circuit itself is open. The fifth switch is adapted to close after the first switch is closed, but before the second switch is opened.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWINGS

A specific embodiment of the invention has been chosen for purposes of illustration and description, and is shown in the accompanying drawings, forming a part of specification, wherein.

DESCRIPTION OF THE PRIOR ART AND PREFERRED EMBODIMENTS

Figure 1:
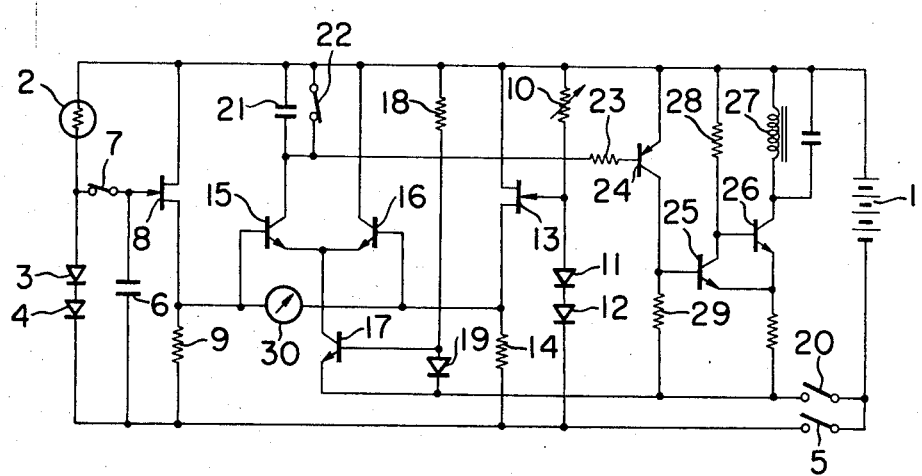
FIG. 1 is a circuit diagram of the exposure time control device in a camera according to the prior art.

Referring to FIG. 1 of the drawings throughout which similar parts are designated by similar reference numerals, there is shown a known exposure time control circuit which includes a power source such as battery 1, a photoconductive element 2 and diodes 3,4 serially connected together and parallel-connected with the battery 1 through a switch 5. In a single-lens reflex camera, for example, the photoconductive element 2 is retractably mounted either on each side of an eyepiece behind a pentaprism or just in front of the plane of film so that the element 2 may be illuminated by light passed from an object through a photo-taking lens. The circuit is such that when the switch 5 is closed, a current from the battery 1 flows through the photoconductive element 2 to the diodes 3,4, across which there will appear a voltage proportional to the logarithm of the intensity of light entering the photoconductive element 2. A storage capacitor 6 is parallel-connected with the diodes 3,4 through a normally closed switch 7 which is adapted to open only when the shutter is operated. The storage capacitor 6 is charged to the same voltage level as the terminal voltage across the diodes 3,4. The point of connection between the storage capacitor 6 and the switch 7 is connected with the gate electrode of a field effect transistor 8, whose drain electrode is connected with the positive terminal of the battery 1 and whose source electrode is connected with the switch 5 through a resistor 9.

A resistor 10 and diodes 11,12 are parallel-connected with the battery 1, the resistor 10 being one whose resistance value is variable in response to the movement of a shutter in the photo-taking lens and a film sensitivity setting means. The point of connection between the resistor 10 and the diodes 11,12 is connected with the gate electrode of a field effect transistor 13, whose drain electrode is connected with the positive terminal of the battery 1 and whose source electrode is connected with the switch 5 through a resistor 14. Since the logarithm of the resistance value of the resistor 10 is variable with the logarithm of the inverse number of the $f$-value of the lens and with the logarithm of the inverse number of the film sensitivity, a voltage proportional to the sum of the logarithm of the inverse number of the lens $f$-value and the logarithm of the inverse number of the film sensitivity will occur across the diodes 11,12. Moreover, both the field effect transistors 8 and 13 are source followers and, therefore, there will appear across the resistors 9 and 14 voltages shifted by a predetermined amount from the voltage stored in the storage capacitor 6 and the terminal voltage across the diodes 11,12, respectively. Transistors 15 and 16, which constitute well-known differential amplifiers, have their respective emitters coupled together and connected with the collector of a transistor 17 for absorbing a constant current. The base of the transistor 17 is connected with the point of connection between a resistor 18 and a diode 19. One end of the resistor 18 is connected with the positive terminal of the battery 1, and the emitter of the transistor 17 and the negative terminal of the diode 19 are connected with the negative terminal of the battery 1 through a switch 20. The switch 20 is adapted to close immediately before the shutter opening operation is initiated and to open after the shutter closing operation has been started. When the switch 20 is closed, a current governed by the resistance value of the resistor 18 flows to the diode 19 and a current of the same value as that current is absorbed by the transistor 17.

The bases of the transistors 15 and 16 forming differential amplifiers are connected with the source electrodes of the field effect transistors 8 and 13, respectively. In other words, the differential input to the differential amplifiers is a voltage proportional to the sum of the logarithms of the light intensity and the film sensitivity minus the logarithm of the lens $f$-value. Since the output current of the differential amplifiers is proportional to the index of the differential input voltage, the output current, i.e., the collector current of the transistor 15, is, after all, proportional to the light intensity and the film sensitivity and inversely proportional to the $f$-value. A capacitor 21 and a switch 22, adapted to open upon the initiation of the shutter opening operation, are parallel-connected together and inserted between the collector of the transistor 15 and the positive terminal of the battery 1. The capacitor 21 is charged with the output current from the differential amplifiers upon initiation of the shutter opening operation. The collector of the transistor 15 is connected through a resistor 23 with the base of a transistor 24. Transistors 24, 25 and 26 are arranged to constitute a switching circuit for controlling a magnet 27, which may be excited when the switch 20 is closed. Since the switch 22 remains closed, the base of the transistor 24 is substantially at the same potential as the positive terminal of the battery 1 so that no current flows to the transistor 24. Therefore, the base of the transistor 25 is substantially at the same potential as the negative terminal of the battery 1 so that no current flows to the transistor 25, either. The voltage of the battery 1 is applied to the base of the transistor 26 through a resistor 28, so that the transistor 26 conducts a current to a magnet 27. When the switch 22 is opened upon initiation of the shutter opening operation, the capacitor 21 starts to be charged so that the collector voltage of the transistor 15, and accordingly the base voltage of the transistor 24, drops while the collector current of the transistor 24 is increased. With an increased voltage drop across a resistor 29, the base voltage of the transistor 25 is increased until it reaches a predetermined value, whereupon the transistor 25 conducts and the base voltage of the transistor 26 drops while the emitter voltage of this transistor rises, so that the transistor 26 is abruptly turned off to deenergize the magnet 27. Thereupon, the shutter closing operation, which has been blocked by the magnet 27, is now released from the magnet so as to allow the shutter to be closed. In order to pre-indicate the exposure time of the shutter to be controlled in the described manner, an indicator 30 is provided between the respective bases of the transistors 15 and 16.

Operation of the circuit shown in FIG. 1 will now be described sequentially. When the switch 5 is closed with the camera looking toward an object, the capacitor 6 is charged with a voltage in proportion to the logarithm of the intensity of light passed from the object through the photo-taking lens of the camera. This voltage is shifted by an amount determined by the characteristic of the field effect transistor 8, and then the shifted voltage is applied to the base of the transistor 15. On the other hand, a voltage proportional to the sum of the logarithms of the inverse numbers of the $f$-values and film sensitivity is applied through the resistor 10 to the base of the transistor 16, whereupon the indicator 30 moves its needle in proportion to the difference between these base voltages. The power consumption at this stage is only of the order of several hundred milliamperes, thus resulting in little or no voltage drop of the battery 1.

When the shutter release button (not shown) is depressed, the switch 7 is first opened to store the brightness of the object while the switch 20 is closed to supply a current to the magnet control circuit comprising the differential amplifiers and switching circuit so that the magnet is excited, as mentioned previously. At this stage, the power consumption reaches about 10 milliamperes, which means a voltage drop of the battery 1. Since the switch 7 has already been opened, the storage capacitor 6 has already stored therein a voltage divided from a high battery voltage before its drop by the photoconductive element 2 and diodes 3,4, and a voltage corresponding to such divisional voltage is applied to the base of the transistor 15. On the other hand, the transistor 16 will be supplied with a voltage corresponding to a voltage divided from a lower battery voltage after its drop by the resistor 10 and diodes 11,12. Subsequently, upon initiation of the shutter opening opration, the switch 22 is opened to charge the capacitor 21 with a current proportional to the index of the difference between the input differential amplifiers 15 and 16. When the voltage drop across the capacitor 21 reaches a predetermined value, the magnet 27 is electrically disconnected to close the shutter. In this regard, problems will arise in that the degree of the voltage drop across the battery 1 caused by the closing of the switch 20 is greater relative to the degree of the battery power consumption, and that cold weather conditions cause a great voltage drop of the battery even if it is a fresh one, thus resulting in an error of the exposure time. Such problems may be solved by the present invention, which will be described hereunder.

Figure 2:
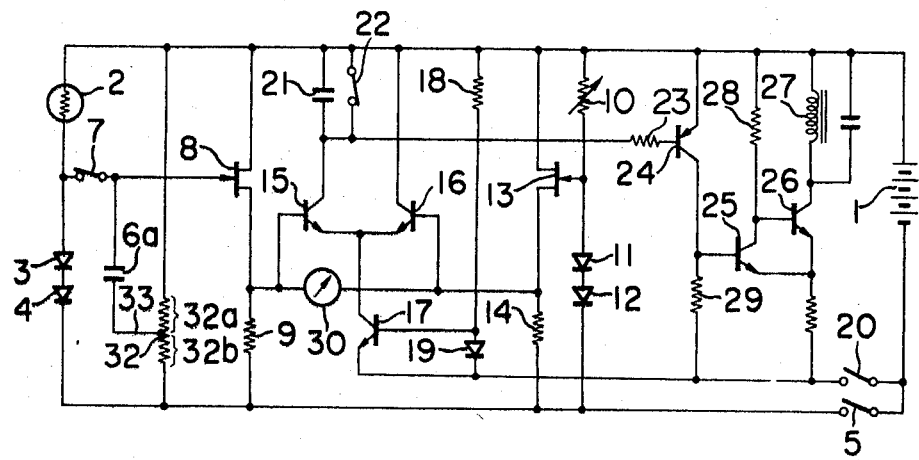
FIGS. 2, 3 and 4 are circuit diagrams showing embodiments of the exposure time control device according to the present invention.

Referring now to FIG. 2, there is shown a first embodiment of the present invention. The circuit, according to this embodiment, includes a compensation resistor 32 parallel-connected with a battery 1 through switch 5, and a storage capacitor 6a having one end thereof connected through a tap 33 with the compensation resistor 32 at the mid-point thereof. Thus, the resistor 32 is segmented into two resistor sections 32a and 32b, which are connected with the positive and negative terminals of the battery 1, respectively. When the switch 5 is closed, the capacitor 6a will be charged in accordance with the difference between the potential at the point of connection between diodes 3 and 4 and photoconductive element 2, and the potential at the point of connection between compensation resistor 32 and tap 33. When the switch 7 is opened and then switch 20 is closed, as described previously, a current will flow from the battery 1 to the magnet so that the battery will experience a voltage drop. This voltage drop is divided by the resistor sections 32a and 32b, so that the potential at the gate electrode of field effect transistor 8 is reduced by a decrement corresponding to the voltage produced at the resistor section 32b due to that voltage drop. As a result, the base voltage of transistor 15 is also reduced by the same decrement. Thus, compensation for any error of exposure time may be accomplished by selecting the base voltage drop of the transistor 15 to a level equal to the base voltage drop of the transistor 16 resulting from the voltage drop of the battery 1.

Figure 3:
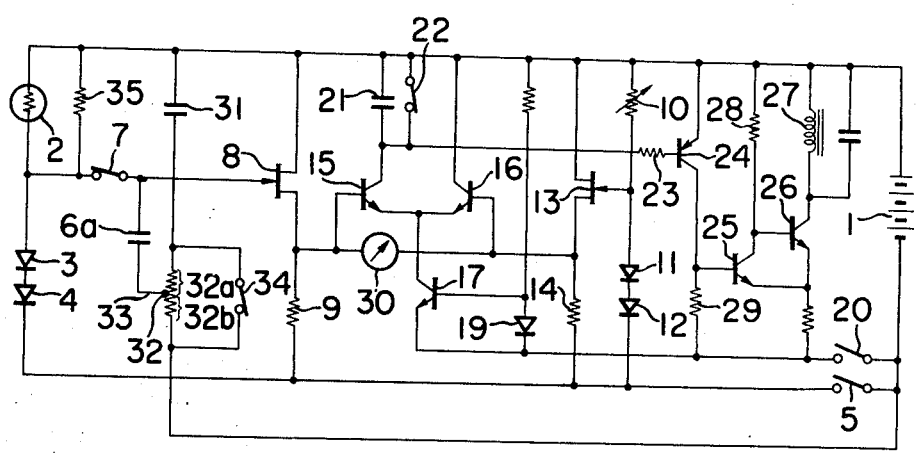

FIG. 3 shows a second embodiment of the present invention, in which a compensation capacitor 31 and a compensation resistor 32 are serially connected together and parallel-connected with battery 1, and one end of storage capacitor 6a is connected through a tap 33 with resistor 32 at the mid-point thereof. This ensures the compensation capacitor 31 to be always charged to the same voltage level as that of battery 1 and also ensures the storage capacitor 6a to maintain the same voltage level as the terminal voltage of battery 1 until switch 5 is closed.

By selecting the resistance value of the resistor 32 to a sufficiently great value and selecting the product of such resistance and the capacity of the capacitor 32, i.e., the time constant to a sufficiently great value, the charge stored in the capacitor 31 will not abruptly be discharged even if a voltage drop is caused in the battery 1 upon closing of the switch 20 during the operation of the circuit which takes place in the described sequence, so that the voltage at the connection point between capacitor 31 and resistor 32 will become lower than the negative terminal voltage of battery 1 by the voltage decrement of the battery. As a result, the potential at the gate electrode of field effect transistor 8 will be reduced by an amount corresponding to the voltage produced across the resistor section 32b between the tap 33 of resistor 32 and the negative terminal of battery 1, thus resulting in a corresponding drop of the base voltage of transistor 15. Thus, any erroneous exposure time may be compensated for by selecting the base voltage drop of the transistor 15 to a level equal to the base voltage drop of the transistor 16 resulting from the voltage droop of battery 1. Where the characteristic of the switching circuit depends on the battery voltage, compensation may be accomplished by changing the position of the tap 33 correspondingly. The greatest compensation will be provided by connecting the tap 33 with the point of connection between capacitor 31 and resistor 32. Where a very long exposure time is to be controlled continuously, a time constant of correspondingly great magnitude must be selected for the capacitor 31 and resistor 32, but this might prevent the capacitor 31 from being charged after the capacitor discharges through the resistor 32 during the shutter operation, thus failing to achieve a compensation effect. For this reason, a switch 34, adapted to close only when the shutter operation has been completed, is parallel-connected with the resistor 32 so that even after a long exposure time the capacitor 31 may be rapidly charged to the same voltage level as the voltage level which the battery 1 assumes during the exposure measurement. Further, a resistor 35 of sufficiently high resistance value is parallel-connected with the photoconductive element 2 so as to bypass the current when the camera is in such a dark environment that no current is supplied to the capacitor 6a through the photoconductive element.

Figure 4:
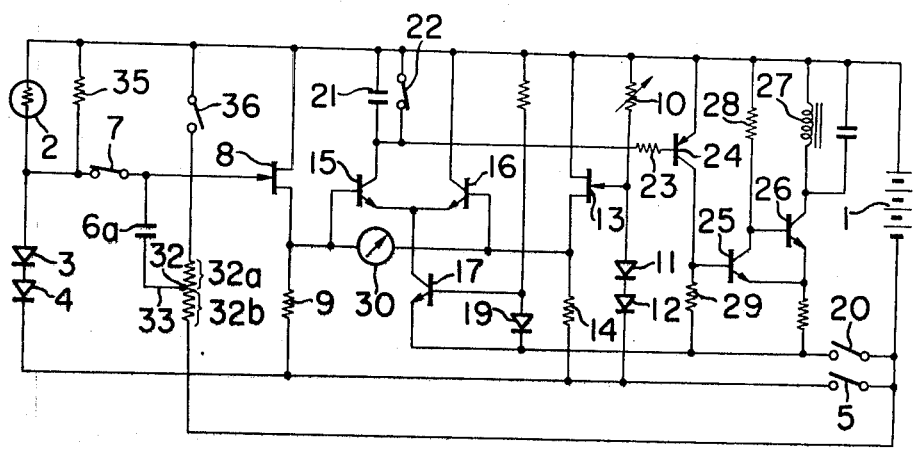

FIG. 4 shows a third embodiment which is a modification of the second embodiment. This embodiment is similar to that of FIG. 3 with an exception that a switch 36, instead of the capacitor 31 and switch 34 shown in FIG. 3, is connected in series with the compensation resistor 32. The switch 36 is normally opened to avoid unnecessary power consumption of the battery 1 and adapted to close after the switch 5 is closed, but before the switch 7 is opened. Such a construction of the switch 36 ensures that the storage capacitor 6a be charged to the same voltage level as the terminal voltage of the battery 1 before the switch 5 is closed.

When the switch 5 is closed, the voltage across the storage capacitor 6a becomes equal to the terminal voltage of the diodes 3,4 and then the switch 36 is closed. Needless to say, even after the switch 36 is closed, the potential at the gate electrode of field effect transistor 8 remains unchanged as long as the switch 7 is closed. Thereafter, the switch 7 is opened and the switch 20 is closed, whereupon the gate potential of the field effect transistor 8 is reduced by a decrement corresponding to the voltage produced across the resistor section 32b as the result of the voltage drop across the power source 1. Accordingly, the base voltage of the transistor 15 is correspondingly reduced. Thus, by selecting the base voltage drop of the transistor 15 to a value equal to the base voltage drop of the transistor 16 resulting from the voltage drop of the battery 1, compensation may be provided for the error of exposure time which would result from the source voltage drop.

It will thus be apparent that the present invention can compensate for any variation in exposure time resulting from a source voltage drop and thereby control the exposure time properly.

In the embodiments shown in FIGS. 3 and 4, if a tantalum capacitor is employed as the storage capacitor 6a which is charged at all times, the leakage current therefrom may be extrmely minimized so as to eliminate any error or exposure time which would otherwise result from such leakage current after a long shutter exposure time.

We believe that the construction and operation of our novel exposure time control device will now be understood, and that the advantages of our invention will be fully appreciated by those persons skilled in the art.

We claim:

1. In a device for controlling exposure time in an automatic exposure camera which device includes:
  a. a power source;
  b. a photoelectric converter circuit including a photoconductive element having a resistance value determined by the intensity of light from an object to be photographed, and an impedance element connected in series with said photoconductive element, said photoelectric converter circuit being connected with said power source;
  c. a first switch connected in series with and between said photoelectric converter circuit and said power source to make and break the connection therebetween;
  d. a storage capacitor for storing a voltage divided by said photoconductive element and said impedance element when said first switch is closed;
  e. a second switch connected between the point of connection between said photoconductive element and said impedance element and one end of said capacitor, said second switch being adapted to open after said first switch is closed, the voltage stored in said storage capacitor becoming independent of any variation in the resistance value of said photoconductive element after said second switch is opened;
  f. a magnet driving circuit including a magnet for controlling the exposure time of the camera's shutter in accordance with the voltage stored in said storage capacitor, said magnet driving circuit being connected with said power source in parallel relationship with said photoelectric converter circuit; and
  g. a third switch connected between said magnet driving circuit and said power source to make and break the connection therebetween, said third switch being adapted to close after said second switch is opened;

the improvement comprising:
  a compensation circuit connected with said power source in parallel relationship with said photoelectric converter circuit and said magnet driving circuit, said compensation circuit including a resistor;
  the other end of said storage capacitor being connected with said compensation circuit so as to apply to said storage capacitor part of a voltage drop caused across said resistor by a voltage drop occurring in said power source when said third switch is closed.

2. A device according to claim 1, wherein said compensation circuit further includes a capacitor connected in series with said resistor and with said power source at all times.

3. A device according to claim 2, wherein said compensation circuit further includes a fourth switch parallel-connected with said resistor, said fourth switch being open at least when said magnet driving circuit is in operation.

4. A device according to claim 1, wherein said compensation circuit is connected with said power source through said first switch.

5. A device according to claim 1, wherein said compensation circuit further includes a fifth switch serially connected therein so that said storage capacitor is effectively connected with said power source through said second switch even when said compensation circuit itself is open, said fifth switch being adapted to close after said first switch is closed, but before said second switch is opened.

6. A device according to claim 1, wherein said impedance element comprises a diode.

* * * * *